US008756051B2

(12) United States Patent
Noldus et al.

(10) Patent No.: US 8,756,051 B2
(45) Date of Patent: Jun. 17, 2014

(54) METHOD AND COMMUNICATION NETWORK FOR PROVIDING ANNOUNCEMENTS IN PREFERRED LANGUAGE WHILE ROAMING

(75) Inventors: Rogier August Caspar Jospeh Noldus, Goirle (NL); Arvind Dev Sharma, Forstern (DE); Ulf Ingemar Olsson, Sollentuna (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 1183 days.

(21) Appl. No.: 12/088,314

(22) PCT Filed: Sep. 30, 2005

(86) PCT No.: PCT/NL2005/000710
§ 371 (c)(1),
(2), (4) Date: Aug. 20, 2008

(87) PCT Pub. No.: WO2007/037677
PCT Pub. Date: Apr. 5, 2007

(65) Prior Publication Data
US 2009/0018816 A1   Jan. 15, 2009

(51) Int. Cl.
*G06F 17/20* (2006.01)
(52) U.S. Cl.
USPC ............ 704/8; 704/1; 704/2; 704/9; 715/256; 379/1.01; 455/412.1; 455/412.2; 455/413; 455/414.2; 455/425; 455/432.1; 455/433; 455/439
(58) Field of Classification Search
USPC ................ 704/1, 2, 8, 9; 715/256; 455/412.1, 455/412.2, 413, 414.2, 425, 432.1, 433, 455/439; 379/1.01
See application file for complete search history.

(56) References Cited

U.S. PATENT DOCUMENTS

| | | | | |
|---|---|---|---|---|
| 5,933,487 A * | 8/1999 | Strickland | ............... | 379/209.01 |
| 6,418,197 B1 * | 7/2002 | Tuunanen et al. | .......... | 379/67.1 |
| 6,496,570 B1 * | 12/2002 | Nimphius | ................. | 379/88.25 |
| 7,006,825 B2 * | 2/2006 | Tornkvist | ................... | 455/432.1 |
| 7,248,569 B2 * | 7/2007 | Bae et al. | ...................... | 370/328 |
| 7,310,511 B2 * | 12/2007 | Barnea et al. | ................ | 455/408 |
| 7,929,669 B2 * | 4/2011 | Howe | ............... | 379/76 |
| 2004/0033815 A1 * | 2/2004 | Noldus et al. | ................ | 455/560 |
| 2004/0242188 A1 * | 12/2004 | Uchida et al. | ................ | 455/403 |
| 2004/0266462 A1 * | 12/2004 | Chava et al. | ................ | 455/466 |
| 2005/0090247 A1 * | 4/2005 | Tornkvist | ................... | 455/432.1 |
| 2005/0176445 A1 * | 8/2005 | Qu et al. | ....................... | 455/458 |
| 2005/0186939 A1 * | 8/2005 | Barnea et al. | ................ | 455/405 |
| 2005/0213520 A1 * | 9/2005 | Bae et al. | ...................... | 370/277 |
| 2006/0046740 A1 * | 3/2006 | Johnson | .................... | 455/456.1 |
| 2006/0188076 A1 * | 8/2006 | Isenberg | ................... | 379/88.02 |
| 2006/0245576 A1 * | 11/2006 | Henry | ...................... | 379/265.01 |
| 2006/0293039 A1 * | 12/2006 | Maislos | ........................ | 455/418 |
| 2007/0010245 A1 * | 1/2007 | Levitan | ....................... | 455/426.1 |
| 2009/0018816 A1 * | 1/2009 | Noldus et al. | .................... | 704/8 |

FOREIGN PATENT DOCUMENTS

| | | | |
|---|---|---|---|
| DE | 44 30 991 A1 | 3/1996 | |
| EP | 0 886 424 A | 12/1998 | |
| WO | WO 98/27759 A | 6/1998 | |

* cited by examiner

*Primary Examiner* — Lamont Spooner

(57) ABSTRACT

Communication network and method for providing communication facilities for a plurality of users. The communication network comprises an announcement generating element (14) for sending network related messages to any of the users. A further network element is connected to the announcement generating element, the further network element being arranged for determining a preferred language for a specific user (10) of the plurality of users, and sending network related messages to the specific user (10) in the preferred language.

13 Claims, 2 Drawing Sheets

Figure 1:
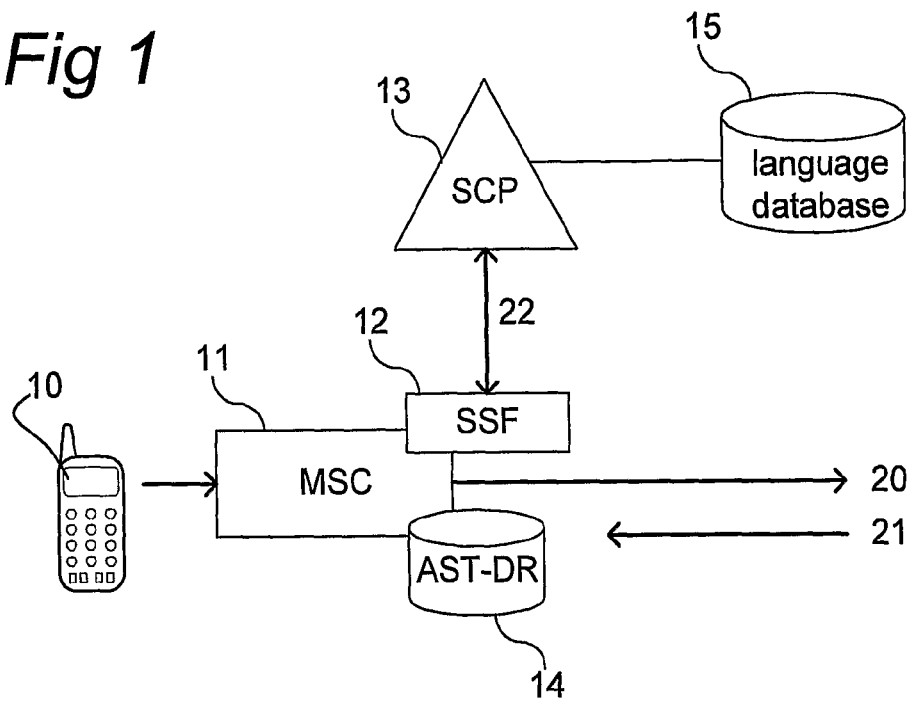

METHOD AND COMMUNICATION NETWORK FOR PROVIDING ANNOUNCEMENTS IN PREFERRED LANGUAGE WHILE ROAMING

FIELD OF THE INVENTION

The present invention relates to providing network messages in a user's home language while roaming. In particular, the present invention relates to a method for providing network related messages in a communication network such as a mobile telephony network, the communication network being arranged to provide communication facilities for a plurality of (mobile) users. Furthermore, the present invention relates to a communication network for providing communication facilities for a plurality of (mobile) users.

PRIOR ART

In known telecommunication systems, network messages or announcements are provided in the local language of the network. Some users of the network may not be able to understand these messages. This is especially the case for roaming users from other networks. As a result, a user will redial and hear the same announcement, or the user will try and associate with another network available in that area. In both cases, revenue is lost for the operator of the network.

SUMMARY OF THE INVENTION

The present invention seeks to provide a method that will allow a user of a terminal in a mobile network to understand any network related messages, and as a result will improve the efficiency of use of the network.

According to the present invention, a method according to the preamble defined above is provided, in which the method comprises determining a preferred language for a specific user, and sending network related messages to the specific user in the preferred language. By making the language of the network messages dependent on a specific user, the problem as discussed above may be eliminated. Network related messages may include, but are not limited to, network welcome messages, warning messages ('The number you have dialed is busy, please try later'), or voicemail messages 'This is the voicemail of John, please speak after the beep'). The plurality of users may comprise a first group of users and a second group of roaming users. The present invention is especially useful for a roaming user, i.e. a user with a mobile terminal being used in the coverage area of a (visited) network different from its own associated network. However, also users of the network for who the (standard) language of the network is not their mother tongue may benefit from this invention.

In an embodiment of the present invention, the preferred language is determined based on data available in the communication network. This allows to automatically determine the desired language of the user of the specific terminal, without any human intervention.

The preferred language may in a further embodiment of the present invention be determined on basis of an identification of the specific user, such as a Mobile Subscriber ISDN (MSISDN) number or an International Mobile Subscriber Identification (IMSI). These identification data are part of data being exchanged in a mobile network when the specific terminal is associated with that network, and thus readily available.

In a further embodiment, the preferred language is determined on basis of data received from a home network associated with the specific terminal, upon registration of the specific terminal in the communication network. In GSM networks, data is requested by a visited network from the home network of the subscriber once the specific terminal associates with the visited network, and data concerning the preferred language may be easily added to that data by the home network.

A preferred language indicator associated with the specific user may be stored in a local database of the communication network in a further embodiment. Thus, the preferred language of a specific user is known. The local database may be part of the HLR or Gateway Location Register (GLR) of the visited network. It may be stored in the local database for the period of time in which the specific terminal is serviced by the visited network, or alternatively, the period of time may extend longer, to enable a direct correct use of language when the specific terminal visits at a later time.

In an even further embodiment, the present method may further comprise storing the language indicator upon receiving a selection reply from the specific terminal, e.g. as a reply to an SMS welcome message. Alternatively, a specific terminal may send an SMS message with an indication of the desired language to a dedicated number in the visited network, or a call to a dedicated number for a specific language choice may be made.

In a further aspect, the present invention relates to a communication network according to the preamble defined above, the communication network comprising an announcement generating element for sending network related messages to any of the plurality of users, and a further network element connected to the announcement generating element, the further network element being arranged for determining a preferred language for a specific user of the plurality of users, and sending network related messages to the specific terminal in the preferred language. In further embodiments, the communication network comprises further network elements, such as a local database, in which one or more network elements are arranged to execute the various method embodiments, as described in the dependent claims.

In an even further aspect, the present invention relates to a computer program product comprising computer executable code, which when loaded on a network element having a processor and associated memory elements, in which the network element is part of a communication network, provides the communication network with the functionality of one of the present method embodiments. The computer program product may be provided on a separate carrier, e.g. an optical disc or semiconductor memory, or may be uploaded directly to the relevant network element(s).

SHORT DESCRIPTION OF DRAWINGS

Figure 2:
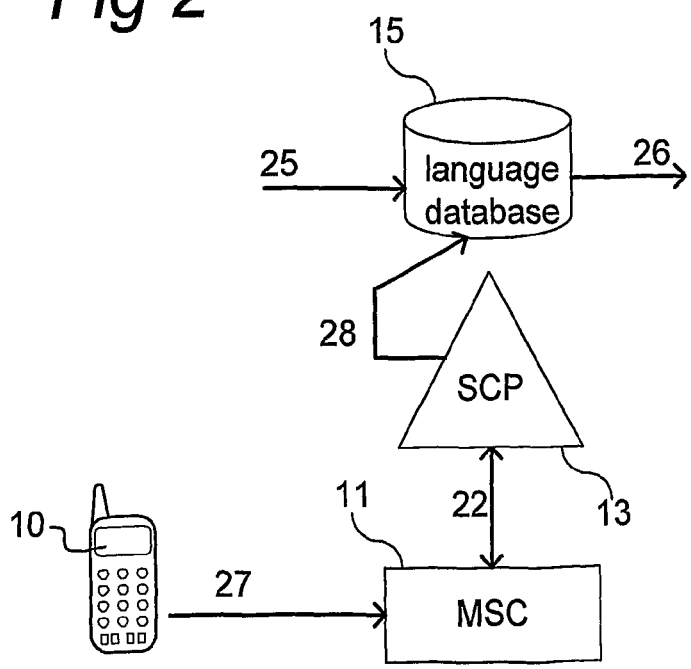
Figure 3:
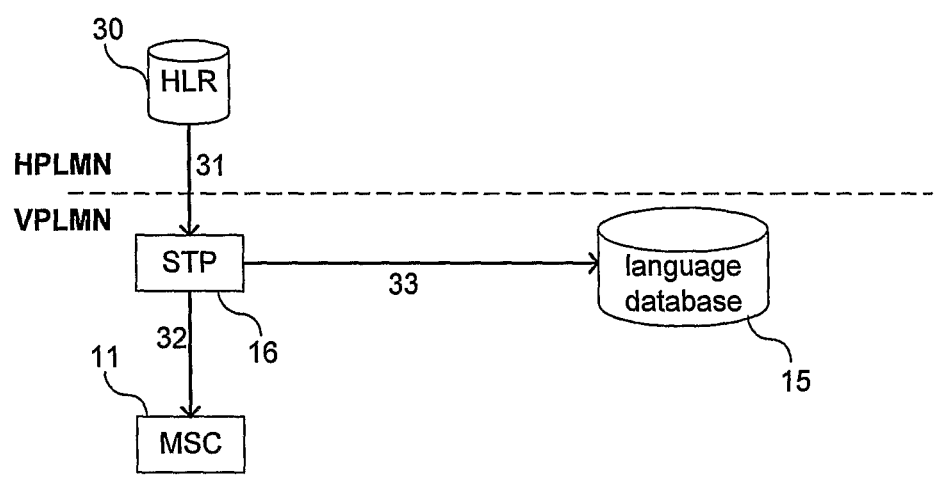

The present invention will be discussed in more detail below, using a number of exemplary embodiments, with reference to the attached drawings, in which:

FIG. 1 schematically shows part of a network according to an embodiment of the present invention;

FIG. 2 shows a graphical representation of data flows according to an embodiment of the present invention; and FIG. 3 schematically shows the interaction between a home network and a visited network according to a further embodiment of the present invention.

DETAILED DESCRIPTION OF EXEMPLARY EMBODIMENTS

With reference to FIG. 1, a first embodiment of the present invention will be described. In FIG. 1, a roaming mobile station 10 is shown, which is located in the coverage area of a mobile communication network (Visited Public Land Mobile Network, VPLMN). Most of the time, the mobile station 10 would be operated by a user in its own mobile communication network, or Home Public Land Mobile Network (HPLMN). The mobile communication network comprises a mobile switching center (MSC) 11 that is able to establish communication with the mobile station 10. Furthermore, the mobile communication network comprises a service control point (SCP 13), which is a platform for executing and controlling intelligent network (IN) services. A service switching function (SSF) 12 is present, usually as a part of the MSC 11, for providing a relay function between the MSC 11 and SCP 13 for IN services. Furthermore, an announcement generating device 14 is present which may combine a number of functions, including an Announcement Service Terminal, a Digital speech phrasing function and a Random access memory (AST-DR). The announcement generating device 14 may be part of the MSC 11, but may also be provided as a separate network unit, or as part of another network unit. In this embodiment, also a language database 15 is present, in this case connected to the SCP 13.

According to embodiments of the present invention, when a user 10 registers with a visited GSM network (VPLMN, e.g. in a foreign country), the network identifies the roaming subscriber 10 with the country code of her MSISDN (Mobile Station ISDN). This is then used for the playing of the network-generated announcement in the subscriber's home language. When a subscriber re-registers in the network at a later visit, the information collected in the earlier visit is used to determine the subscriber's preferred language.

Some of the typical network generated announcements are "please check the number you have dialled", "the network is busy, please try later". Network busy is also available as a standard tone but also as an announcement. Also some networks play an announcement in the local language, such as "you will now be connected to the voice mailbox of 06 516 13 444; please leave a message after the beep", or "Please wait, your call is being forwarded". The local voicemail box may be arranged to play the message "This is the voicemail box of family Smith, please leave a message after the beep.".

Linking this service to Call Completion type of applications, where the end-user does not need to call back but the network generates the call, can further enhance the user experience.

When call establishment in the MSC 11 fails, e.g. due to dialling an incorrect number, the B-number analysis in the MSC 11 generates a failure code. Based on the failure code, an IN service is triggered for the roaming subscriber 10. The IN service then checks the language code of the roaming subscriber 10 and plays the relevant announcement. Checking the language code of the subscriber 10 is done by querying the language database 15, as described above.

The method and system embodiments of the present invention provide a better network utilization, by preventing that a roaming subscriber 10 receives the same announcement when the roaming subscriber 10 does not understand the first announcement and redials. This would result in utilization of network resources without revenue. Also, it is prevented that a roaming subscriber 10 leaves the network for another network hoping for a better, more understandable announcement.

In an embodiment of the present invention, error messages "in the call set up", "during a call" and "at the end of a call" are used to trigger an IN service, e.g. in the form of a Route Select Failure (RSF) event or other failure code. The information from this message is used to define what the IN service will do, for example, what message to play. The call that the inbound roaming subscriber (from mobile station 10) establishes, results in an ISDN User Part (ISUP) initial address message (IAM) 20 from the MSC 11. This message may result in an error message 21 (ISUP Release message), e.g. Route Select Failure (RSF). The RSF message may occur inside the MSC 11 or outside the MSC 11, the latter case being shown in FIG. 1. The MSC 11 now wants to play an announcement to the calling subscriber 10, informing her that the call could not be established and that she should check the number and dial again. Since the calling subscriber 10 is recognized as an inbound roaming subscriber (based on her MSISDN or on her international mobile subscriber identity, IMSI), the MSC 11 uses a failure code that has the effect that the call is routed to the SSF 12 in the MSC 11. The SSF 12 could also be located outside the MSC 11, i.e. in a switching service platform (SSP).

The SSF 12 triggers a special "inbound subscriber announcement service" in the SCP 13. The VPLMN operator operates this SCP 13. The protocol 22 that is used between the SSF 12 and the SCP 13 may be CS1 (Capability Set 1, an industry standard protocol for IN services), CS1+(enhanced CS 1), CAP (CAMEL application part, an industry standard for CAMEL services), or other types of network protocols, such as SIP (Session Initiation Protocol). The Initial Detection Point (IDP) operation that is sent from the SSF 12 to SCP 13 contains, amongst others, the MSISDN of the calling subscriber 10. The IDP should also contain an indication of the error that occurred, so the SCP 13 knows which announcement to select. Different error conditions in the MSC 11 may lead to different entries in the IN Service Trigger (IST) table in the SSF 12, and different entries in this table may have different Service Key values. Hence, the Service Key value in Initial DP serves as an indication of the error that occurred.

The SCP 13 queries the preferred language database 15 to get an indication of the language for this subscriber 10. Hereto, the SCP 13 provides the MSISDN (as received in Initial DP) to the database 15. In one embodiment, the database 15 uses the MSISDN as search key to select the language that is associated with this subscriber 10. The database 15 then returns a language code to the SCP 13. The SCP 13 uses the language code, together with the error indication in Initial DP, to select the announcement that shall be played. The playing of the announcement is instructed to the SSF 12 by means of existing CAP/CS1/CS1+operations 22, such as Connect To Resource and Play Announcement.

If a subscriber 10 has not indicated a preferred language, then a default language is used, based on the leading digits of her MSISDN. This default language table may be configured in the language database 15 or in the Service Logic in the SCP 13. The following table contains an example of mapping between MSISDN leading digits and language. Note that the country indication is for background information only, it need not be provisioned in the present system.

| MSISDN leading digits | Country | Language |
| --- | --- | --- |
| 31 | Netherlands | Dutch |
| 44 | United Kingdom | English |
| 91 98 200 | India | English |
| 91 98 140 | India | Hindi |
| ... | ... | ... |

The table contains data that is statically configured for the cases where there is a fixed relation between country code plus network code and language. India does not have number portability, hence the fixed relationship.

In FIG. 2 the steps are shown for an embodiment in which an inbound roaming subscriber 10 may be prompted to select a preferred language.

The "Location Update" trigger 25 in FIG. 2 reflects the Mobile Application Part (MAP) signalling between the home location register (HLR) in the HPLMN and the visited MSC (VMSC) in the VPLMN. The specific MAP message, Insert Subscriber Data, is intercepted by a signalling transfer point (STP) and is used to generate the trigger 25 to the language preference database 15. The trigger 25 signals to said database 15 that a particular subscriber 10, identified with IMSI or MSISDN, is registered in the visited network VPLMN. Said database 15 uses this signal to update its internal information, without any need to access the HPLMN associated with the roaming subscriber 10.

When the VPLMN operator of the inbound roaming subscriber 10 sends a welcome SMS 26, the SMS may include the option to dial a (toll-free) number to select the language. This option is in this embodiment included in the welcome SMS only for subscribers from countries with multiple languages, e.g. Canada, Belgium, and China etc. However subscribers from other countries like UK, Germany etc. do have the possibility to select other languages also. The welcome SMS 26 includes the languages that are offered to that subscriber. The welcome SMS 26 may have the form 'Welcome to AIS in Thailand, . . . , Call 0800-444 for English announcements or 0800-445 for French announcements (toll free)', and is in this form intended for a Canadian inbound roaming subscriber 10.

This embodiment of the present invention would in fact allow the Canadian subscriber 10 to dial other (toll-free) numbers, e.g. 0800-446 to select Spanish. However, since English and French are the main languages for this subscriber 10, there is no need to mention Spanish in the SMS. However, this embodiment facilitates that any inbound roaming subscriber 10 dials at any moment 0800-446 or any of the other designated language selection numbers, to select her preferred language. A Dutch subscriber from English origin may therefore dial 0800-444, even though that wasn't prompted in the welcome SMS 26. This option to select language at any moment should be advertised in a suitable and adequate manner.

When a subscriber dials 0800-444 (or any of the other designated language selection numbers), as indicated by numeral 27, the serving MSC 11 triggers an IN service that takes care of setting the language in the database 15. The triggering of said IN service is e.g. done in accordance with "Serving network based dialed services", as specified in CAMEL Phase 3. Alternatively, a proprietary triggering method is used. This may be accomplished using CS1/CS1+/CAP signalling 22 between MSC 11 and SCP 13 as described in relation to the above embodiment, and further signalling 28 from SCP 13 to language database 15. Also other triggering methods may be used, e.g. using a different network protocol such as SIP.

When a subscriber 10 detaches from the MSC 11 and deregisters from the VPLMN (i.e. does not register with another MSC 11 in that VPLMN), the database 15 may retain the subscriber language indicator. When the subscriber 10 re-enters the country, the preferred language is already known. This has the following advantages:

The VPLMN does not need to re-prompt the subscriber 10, when sending a welcome SMS 26, to select her language;

A next welcome SMS 26 may be sent in the preferred language;

A next welcome SMS 26 may read "welcome back to AIS in Thailand".

When a subscriber 10 has not re-registered in the network for a long time e.g. a period of 12 or 24 months, her data will be purged from the language database 15.

FIG. 3 reflects an embodiment of the concept of a language indicator, shown in schematic form. The language indicator is part of the subscriber's profile in the HLR 30 of the HPLMN. When the subscriber registers in an MSC/Visitor Location Register (VLR) 11, the HLR 30 sends a sub-set of the subscription data to that MSC/VLR 11. The subscription data that is sent to MSC/VLR 11 includes the language indicator. This indicator may be used for two purposes:

It is retained in the MSC 11, as part of the subscription settings. The MSC 11 may use the indicator to select the preferred language when playing announcements.

MAP signalling between HLR 30 and VLR 11 normally passes through a Signaling Transfer Point (STP) 16 in the VPLMN (indicated by reference numeral 31 and 32, respectively). The STP 16 may send a notification 33 to the language database 15. The notification includes, as a minimum, a subscriber identification such as IMSI or MSISDN, and the language indicator. The language database 15 stores this indicator.

This concept requires that the language code is internationally standardised, e.g. by 3GPP or by the ITU-T.

The language indicator may be set in the language database 15 by the following stimuli alternatives:

If the STP 16 intercepts a MAP ISD message 31, it sends a notification 33 to the language database 15. If the MAP ISD message 31 does not include the language indicator (originating from the HLR 30), the language database 15 uses the subscriber's IMSI or MSISDN to set the preferred language.

If the STP 16 sends a notification 33 to the language database 15 as described above, and the notification 33 contains the language indicator, retrieved from the MAP ISD message 31, then the language database 15 uses this language indicator to set the preferred language. The language identified by the language indicator takes precedence over the language that is derived from the subscriber's IMSI or MSISDN.

If the language database 15 receives at any moment an SMS message from the subscriber 10 (via MSC 11), indicating that her preferred language is e.g. English (e.g. sending an SMS 'English' to a dedicated SMS number 888), then the language database 15 uses that indication to set the preferred language. The indication received by SMS takes precedence over both the language indication received from HLR 30 and the language that is derived from the subscriber's IMSI or MSISDN. It shall be noted that in order to take full advantage of this embodiment, the SMS should be handled in the VPLMN as a local SMS (e.g. using a predetermined number range), in order to prevent the SMS to be sent to the regular SMSC of the HPLMN.

It may occur that the HPLMN operator has a limited set of available language settings in the HLR 30. E.g. a German operator allows for German, French, English and Spanish as available preferred languages in the HLR 30. When an Italian subscriber 10 holding a German subscription roams in Italy, the HLR 30 may send e.g. German as preferred language. The subscriber 10 may, however, override the setting in the language database 15 in Italy by sending an SMS indicating "Italian".

The present invention has been described above with reference to a number of exemplary embodiments. For the person skilled in the art it will be apparent that various modifications or alternatives may be provided to the elements and steps described. These are part of the scope of this invention, as defined in the appended claims. E.g. various functions in the embodiments above have been described as being executed by a particular element of the mobile communication network. It will be apparent that these functions may also be provided in other network elements, such as dedicated network elements. Furthermore, the functions of the present invention may be provided to the network elements mentioned in the form of computer executable code. The network elements comprise a processor and associated memory elements, as known in the art. When the computer executable code is loaded on the network element the desired functionality is provided to the associated network by the network element in operation. Also, it can be envisaged that the present invention is applied in communication networks other than public land mobile networks, e.g. in public switched telephony networks or in proprietary radio communication networks.

The invention claimed is:

1. In a telecommunications network comprising a Mobile Switching Center (MSC) having an Intelligent Network (IN) Service Switching Function (SSF) and an IN Service Control Point (SCP) for controlling an Intelligent Network (IN) service, a method of providing a roaming subscriber messages in the roaming subscriber's home language, the method comprising:
the MSC determining that the subscriber is inbound and roaming and upon detecting that an error announcement is to be played for the roaming subscriber, triggering the SSF with an error indication, wherein the MSC detects that the error announcement is to be played in response to a call establishment failure in the MSC;
the SSF sending an IN Initial Detection Point (IDP) operation to the SCP, the IDP including an indication of the error and an indication of the language for the roaming subscriber; and
the SCP using the indication of the language and the indication of the error to select the announcement from a language database to be played to the roaming subscriber.

2. The method of claim 1, wherein the indicator of the language for the roaming subscriber is determined by:
data received from a home network associated with the roaming subscriber's terminal,
a language indicator associated with the roaming subscriber and stored in a local database, or
a selection by the roaming subscriber of a language from a list of languages presented by the telecommunications network.

3. The method of claim 1, wherein there is no specific indicator of language preference provided and the language for the roaming subscriber is determined from the roaming subscriber's Mobile Subscriber ISDN (MSISDN) received from the SSF in the IDP or, the roaming subscriber's International Mobile Subscriber Identification (IMSI).

4. The method of claim 1, wherein the roaming subscriber sends an SMS to a specific number, the MSC forwarding the SMS to the IN service, for selecting a preferred language, the language preference being stored in the visited network.

5. The method of claim 4, the stored language preference being made available upon subsequent visits by the roaming subscriber.

6. The method of claim 5, wherein a Signaling Transfer Point (STP) intercepts a response, Insert Subscriber Data, to a Mobile Application Part (MAP) signaling between the roaming subscriber's HLR and the visited MSC, the Insert Subscriber Data being used to generate a trigger to the language database that the roaming subscriber is registered in the visited network, the language database automatically being updated with respect to the roaming subscriber.

7. The method of claim 4, wherein a Signaling Transfer Point (STP) intercepts a response, Insert Subscriber Data, to a Mobile Application Part (MAP) signaling between the roaming subscriber's HLR and the visited MSC, the Insert Subscriber Data being used to generate a trigger to the language database that the roaming subscriber is registered in the visited network, the language database automatically being updated with respect to the roaming subscriber.

8. The method of claim 1, wherein the MSC triggers the SSF with the error indication by providing to the SSF a failure code corresponding to a call failure, and
wherein the method further comprises the SSF selecting from a table, based on the failure code provided by the MSC, the indication of the error for inclusion in the IDP operation sent to the SCP.

9. A Mobile Switching Center (MSC) for providing a roaming subscriber messages in the roaming subscriber's home language, the MSC having an Intelligent Network (IN) Service Switching Function (SSF) and an IN Service Control Point (SCP) for controlling an Intelligent Network (IN) service, the MSC comprising:
determination means for determining that the subscriber is inbound and roaming and upon detecting that an error announcement is to be played for the roaming subscriber, triggering the SSF with an error indication, wherein the determination means detects that the error announcement is to be played in response to a call establishment failure in the MSC;
transmission means for the SSF sending an Initial Detection Point (IDP) operation to the SCP, the IDP including an indication of the error and an indication of the language for the roaming subscriber; and
selection means for the SCP using the indication of the language and the indication of the error to select the announcement from a language database to be played to the roaming subscriber.

10. The MSC of claim 9, wherein the indicator of the language for the roaming subscriber is determined by data received from a home network associated with the roaming subscriber's terminal, a language indicator associated with the roaming subscriber stored in a local database, or a selection of the language from a list of languages presented by the telecommunications network.

11. The method of claim 10, the stored language preference being made available upon subsequent visits by the roaming subscriber.

12. The MSC of claim 9, wherein there is no specific indicator of language preference and the language for the roaming subscriber is determined from the roaming subscriber's Mobile Subscriber ISDN (MSISDN) received from the SSF in the IDP or the roaming subscriber's International Mobile Subscriber Identification (IMSI).

13. The MSC of claim 9, wherein the roaming subscriber sends an SMS to a specific number, the MSC forwarding the SMS to the IN service, for selecting a preferred language, the language preference being stored in the visited network.

* * * * *

UNITED STATES PATENT AND TRADEMARK OFFICE
CERTIFICATE OF CORRECTION

PATENT NO. : 8,756,051 B2  Page 1 of 1
APPLICATION NO. : 12/088314
DATED : June 17, 2014
INVENTOR(S) : Noldus et al.

It is certified that error appears in the above-identified patent and that said Letters Patent is hereby corrected as shown below:

On the title page, in item (75), Column 1, Line 1, delete "Jospch" and insert -- Joseph --, therefor.

Column 1, Line 44, delete "messages 'This" and insert -- messages ('This --, therefor.

Column 3, Line 41, delete "beep."." and insert -- beep". --, therefor.

Column 4, Line 24, delete "CS 1)," and insert -- CS1), --, therefor.

Column 7, Line 59, Claim 5, delete "claim 4," and insert -- claim 4, wherein --, therefor.

Column 8, Line 50, Claim 11, delete "method of claim 10," and insert -- MSC of claim 10, wherein --, therefor.

Signed and Sealed this
Seventeenth Day of November, 2015

Michelle K. Lee
*Director of the United States Patent and Trademark Office*